United States Patent [19]

DiGiovanni

[11] 4,155,373
[45] May 22, 1979

[54] METHOD FOR SHUTTING OFF GAS FLOW IN PLASTIC PIPES

[76] Inventor: Bernard A. DiGiovanni, 96 Davis St., Hauppauge, N.Y. 11787

[21] Appl. No.: 748,107

[22] Filed: Dec. 6, 1976

[51] Int. Cl.² .............................................. F16L 55/12
[52] U.S. Cl. ..................................... 137/15; 137/318; 138/93
[58] Field of Search .................... 137/15, 318; 138/93, 138/94

[56] References Cited

U.S. PATENT DOCUMENTS

| | | | |
|---|---|---|---|
| 1,946,138 | 2/1934 | Gardner | 138/93 |
| 3,298,398 | 1/1967 | Smith | 138/94 |
| 3,799,182 | 3/1974 | Long | 137/318 X |
| 3,805,844 | 4/1974 | Bacon | 138/93 |
| 3,973,584 | 8/1976 | McKinnon | 137/318 |

Primary Examiner—Alan Cohan
Attorney, Agent, or Firm—Brooks, Haidt, Haffner & Delahunty

[57] ABSTRACT

A tubular plastic fitting is joined to the pipe wall of a plastic gas pipe and a hole is cut through the pipe wall within the fitting, leaving a ledge or shoulder around the hole as a stop for a balloon-type stopper which is then inserted and inflated within the pipe to shut off the flow of gas without substantial leakage of gas to the atmosphere. There is a ringlike compression seal within the fitting that prevents escape of gas around the cutting tool during the cutting operation and also further assures prevention of gas leakage around the stopper when the stopper is inflated within the pipe. After removal of the stopper, a closure member is placed on the pipe fitting.

4 Claims, 16 Drawing Figures

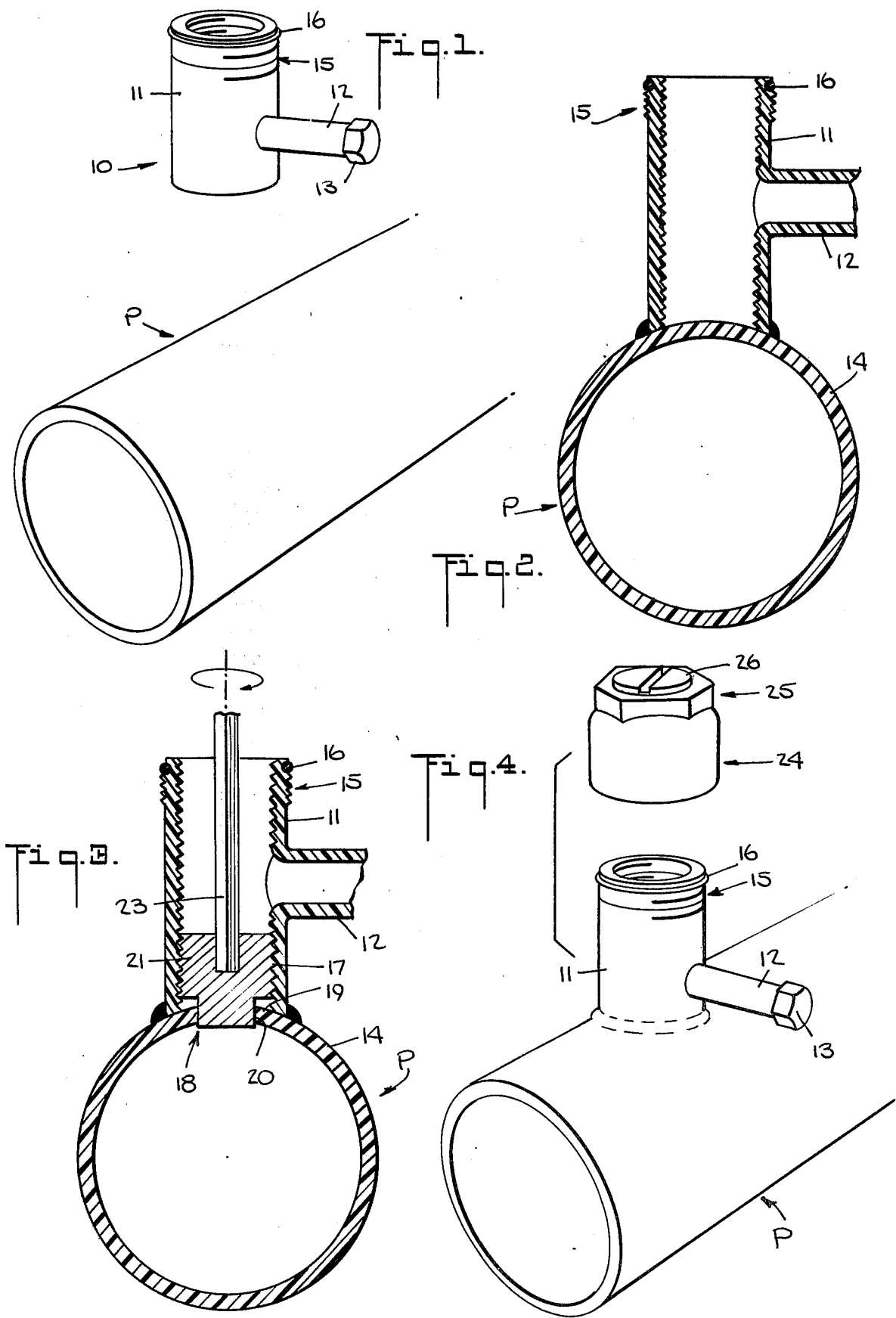

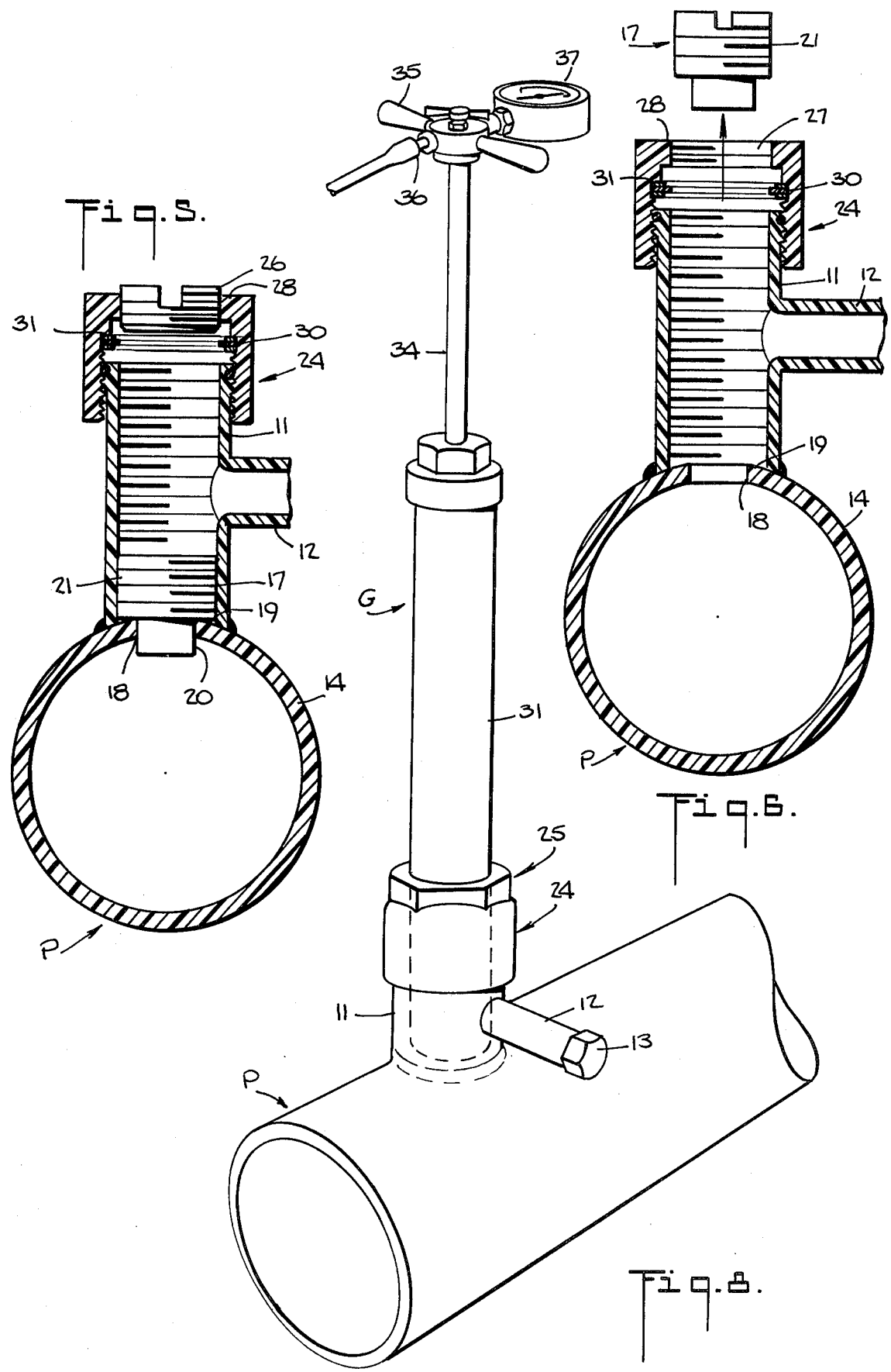

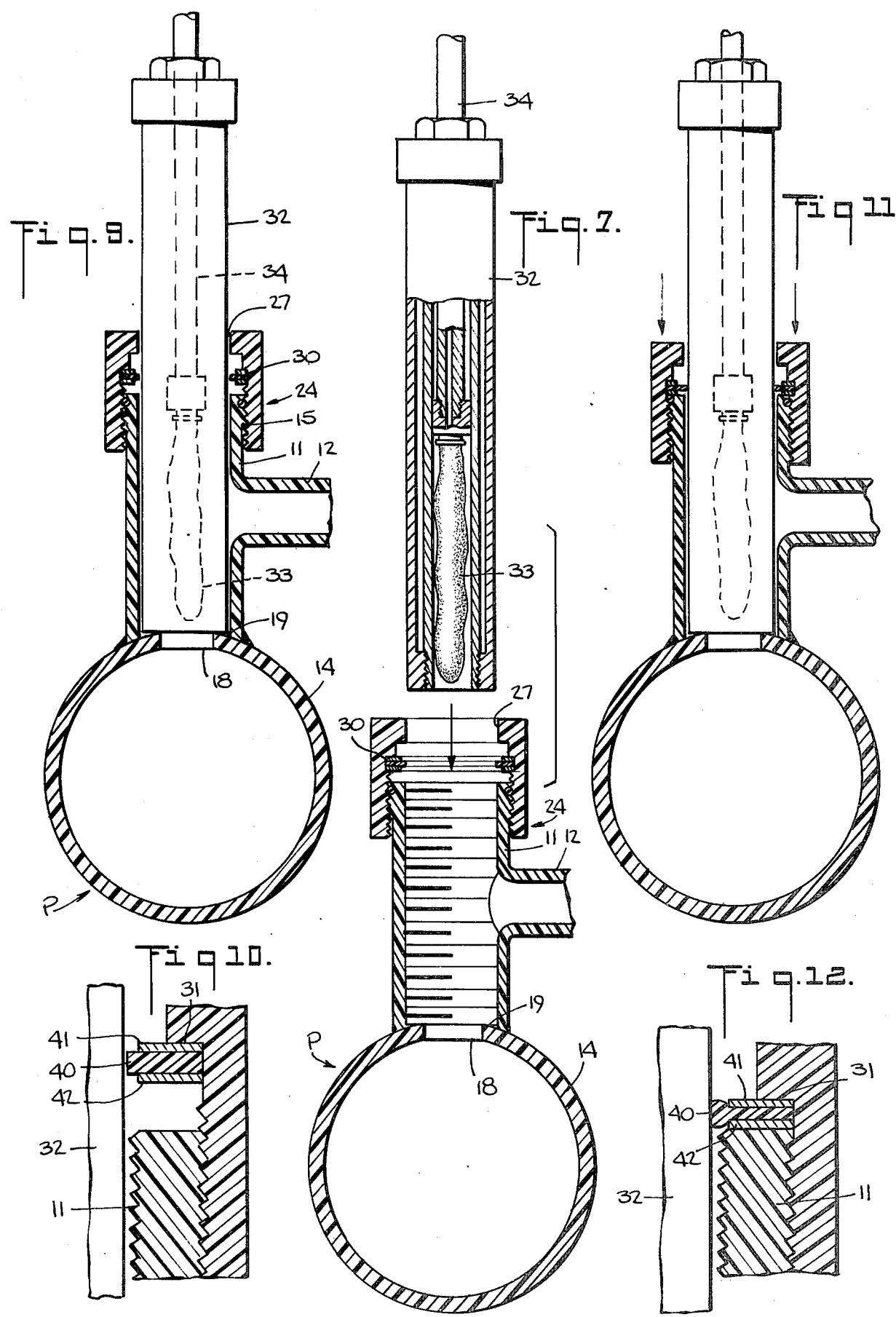

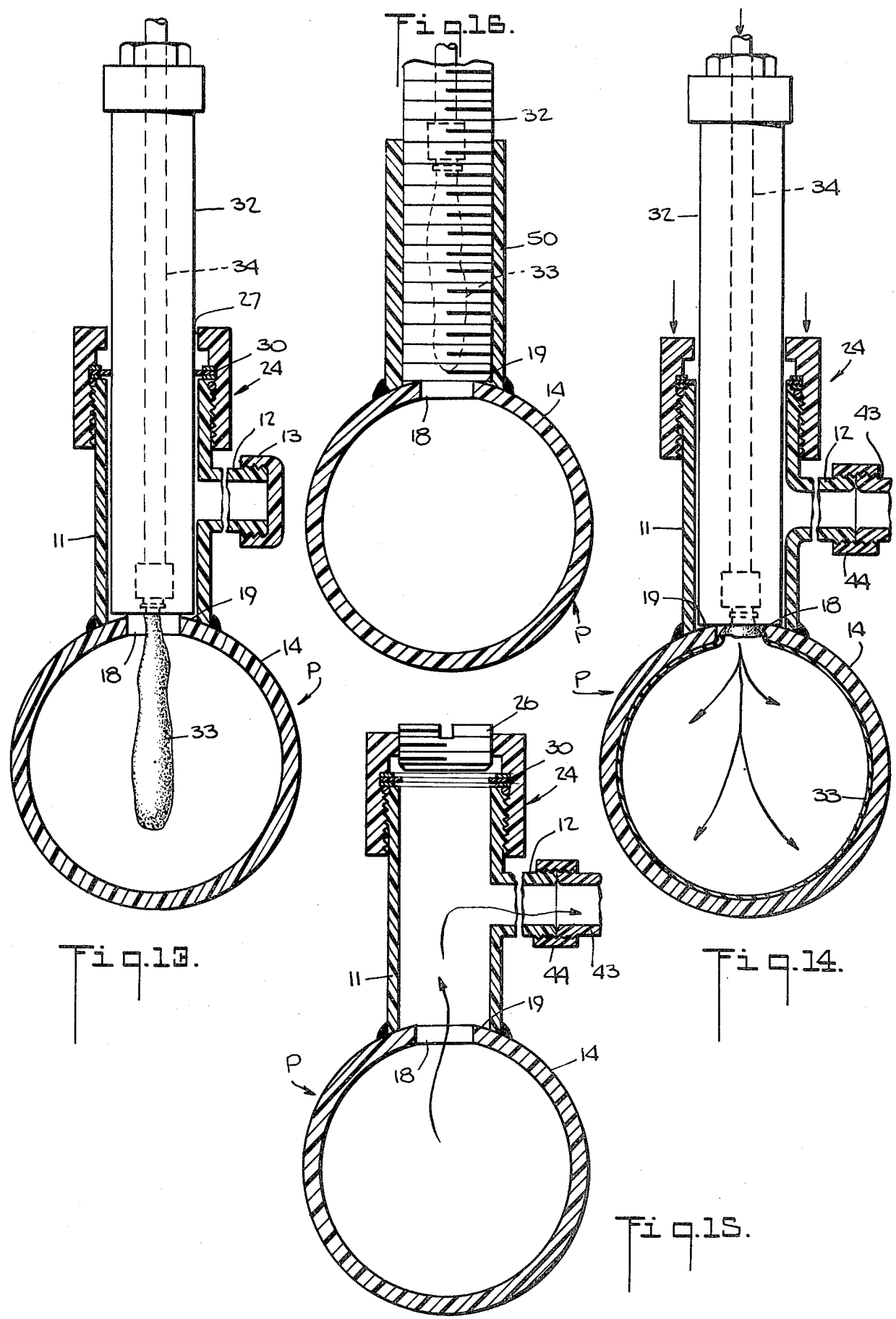

METHOD FOR SHUTTING OFF GAS FLOW IN PLASTIC PIPES

FIELD OF THE INVENTION

The invention relates to shutting off the flow of gas in a pipe, and more particularly to a method for temporarily entering and sealing off the gas flow in a plastic pipe main when gas system repairs or alterations are to be made downstream from the location of the seal.

DESCRIPTION OF THE PRIOR ART

The flow of gas in gas mains can be shut off by means of a balloon-type stopper which has an air-inflatable shut off bag that is inserted through a hole in the wall of the gas main and inflated to block off the internal gas passage of the main. One such balloon-type stopper, known as a Gardner-Goodman Stopper, is commercially available and currently used by utility companies for this purpose.

In the past, gas mains were primarily constructed of metal pipe such as steel pipe, and when a hole had been cut into such pipe for shutting off the gas with a balloon-type stopper, the access hole could be readily plugged up with a threaded steel plug after restoration of gas flow. Pipe made of various plastics, such as polyethylene, is now widely used for gas mains, and a balloon-type stopper can be effectively employed to shut off gas flow in plastic pipe. It might appear that any access hole cut in a plastic pipe might also be closed by using threaded plastic plugs having characteristics similar to those of the material of the pipe, but for safety reasons, the use of threaded plastic plugs in plastic gas mains is prohibited.

The joining of plastic pipe sections by fusion is permissible, so it has been the practice of public utilities to cut out the section of plastic pipe through which an access hole has been made and to replace the cut out pipe section by fusing a new piece of pipe in place in the existing pipe main. Such involves temporary cutoff of the gas supply from another location, which is sometimes inconvenient and additionally disruptive of gas service. However, the inconvenience and expense of replacing pipe sections would be avoided if there were suitable techniques and fittings adapted for use with plastic gas pipes for closing such necessary temporary openings without sectioning the pipe.

SUMMARY OF THE INVENTION

The present invention provides a convenient and effective means for temporarily shutting off the flow of gas in a plastic gas main, and for closing a temporary opening made in the wall of the main for the purpose. The invention is particularly useful to utility companies that provide natural gas or other heating and illuminating gas through gas mains of plastic pipe. The method of the invention employs a balloon-type stopper, such as the Gardner-Goodman Stopper, which is very effective in shutting off the flow of gas in a pipe.

The use of a balloon-type stopper requires that a hole must be made in the pipe wall for the introduction of the stopper balloon into the pipe. Even though the gas in most gas mains is not under high pressure, but only at a relatively low pressure of, say, one-quarter pound per square inch gauge ($\frac{1}{4}$ psig) there is a possibility of considerable initial gas leakage to the atmosphere when a hole of suitable size for introduction of a balloon stopper is made in the wall of a gas main. To avoid this initial waste of gas it is desirable to provide some control fitting to prevent such gas leakage. It is also necessary to provide a means of closing and sealing the pipe wall after the balloon stopper has been removed. In accordance with the present invention this control fitting and reclosing means is provided by a generally tubular member extending perpendicular to the gas main and communicating with the interior of the main through a hole through which the balloon of the balloon stopper can be inserted into the main. The control fitting is also equipped with a removable cap having a central aperture, and an internal ringlike seal, so that when the balloon-type stopper is inserted through the cap the ringlike seal prevents escape of gas. A plug is placed in the apertured cap, or a sealing cap replaces the apertured cap, after the balloon stopper has been removed.

The conventional balloon-type stopper has an elongated cylinder into which an inflatable bag is drawn in deflated condition. The balloon is extended from the stopper cylinder by pushing on a sliding handle, and then the balloon is inflated by use of a pump. The control fitting is sized to slidably receive the stopper cylinder with the ringlike seal embracing the cylinder wall within the fitting.

The tubular part of the control fitting might be constituted by an existing "T" fitting of a utility service connection if such a "T" fitting has an upstanding tubular part suitably sized to receive the balloon stopper and if such tubular part can be fitted with the cap member of the invention. If there is no such existing fitting connected to the main at the point where gas flow is to be shut off, such a control fitting is first attached before making a hole in the pipe wall.

The tubular member, which is of a smaller diameter than the pipe main, is preferably secured in a gas-tight manner to the wall of the pipe main by a fusion process. If the tubular member and the pipe main are formed of polyethylene this fusion process is preferably performed by heating the end of the tubular member and the pipe wall at the area where the joint is to be made with an electric iron having a head shaped to heat the parts evenly and sufficiently to heat the polyethylene for fusing the parts by simply pressing them together. If the pipe main and the tubular fitting member are of some other plastic material such as polyvinyl chloride, it may be preferable to join these parts with an adhesive.

Only after the tubular member of the control fitting has been secured to the main pipe wall is the access hole made through the wall. The cutting tool preferably has external threads to the rear of its cutting edge for mating with internal threads of the tubular member so that the cutting tool is screwed down against the pipe wall and further rotated to cut through the pipe while the interfitting threads prevent escape of gas.

The cap, with its internal seal ring is preferably fitted at the outer end of the tubular member before withdrawal of the cutting tool, so that immediately upon withdrawal of the cutter, the balloon stopper can be inserted through the cap whereupon the seal ring and stopper cylinder prevent gas leakage. Gas only escapes during the very brief interval between extraction of the cutter and insertion of the balloon stopper cylinder.

The hole in the main pipe wall through which the inflatable balloon of the stopper is introduced is not as large as the diameter of the stopper cylinder, so the cylinder can be pushed into the tubular member only to the point at which it contacts the shoulder or ledge formed by the edge surrounding the access hole. At this point the balloon is properly positioned for inflation to fill up the space within the main pipe. The inflation of the balloon by means of a small pump such as a bicycle pump shuts off the flow of gas in the main. When gas flow is to be started again, the balloon is deflated and withdrawn into the cylinder of the stopper, the stopper is removed from the tubular member, and the opening of the tubular member is closed. If the control fitting cap of the invention is to be left in place, the aperture through the cap should have threads for reception of a plug, which can be of plastic if regulations permit, or metal. Otherwise the cap can be removed and a closed top cap screwed on to the tubular fitting in its place.

The method of the invention can be used for attachment of a service connection, such as a "T" fitting to a pipe main, in which case the upstanding tubular member is the cross-member of the "T" and the stem of the "T" is kept closed as by a cap during installation. The outer end of the tubular member is closed after installation and the stem is unca-ped for connection of a branch pipe line thereto, either immediately after installation or at a later time.

These and other objects and advantages of the method apparatus of the invention will be more fully understood by reading the following detailed description of a preferred embodiment of the invention, especially when the description is read with reference to the accompanying figures of the drawing.

BRIEF DESCRIPTION OF THE DRAWINGS

In the accompanying drawings, in which like reference characters designate like parts throughout:

FIG. 1 shows a section of a pipe and a control fitting in the form of a "T" to be attached thereto.

FIG. 2 is a view in section taken along the axis of a pipe with a "T" fitting attached thereto in accordance with the invention.

FIG. 3 shows the cutting of a hole through the wall of the pipe of FIG. 2.

FIG. 4 is a perspective view showing a cap for the control fitting ready for attachment to the fitting, with a plug in the cap.

FIG. 5 is a view similar to those of FIGS. 3 and 4 with the cap of FIG. 4 in place.

FIG. 6 is a view similar to that of FIG. 5 at the stage of withdrawal of the cutting tool.

FIG. 7 shows the manner of insertion of a conventional balloon-type stopper, partly cut away, into a pipe fitted with the control fitting.

FIG. 8 is a view in perspective showing a balloon-type stopper in use in conjunction with apparatus according to the invention.

FIG. 9 is a view in section similar to that of FIG. 7 showing the balloon-type stopper ready for use.

FIG. 10 is a detail view showing sealing means for preventing gas leakage.

FIG. 11 is a view similar to FIG. 9 showing the operation of the cap to effect sealing.

FIG. 12 is a detail view similar to that of FIG. 10 showing the seal in compressed condition.

FIG. 13 is a view similar to that of FIG. 11, but with the balloon extended from the balloon-type stopper cylinder.

FIG. 14 is a view similar to that of FIG. 13, but with the balloon inflated.

FIG. 15 shows a "T" fitting used as a branch connection with a cap according to the invention used as a closure with a plug.

FIG. 16 shows a modified control fitting according to the invention formed as a simple tubular element with no branch.

DETAILED DESCRIPTION OF PREFERRED EMBODIMENTS

The section of pipe generally designated P in the several drawing figures represents a typical length of the plastic pipe currently in use by utility companies for gas mains. Such a typical pipe might have an internal diameter of about six inches, but the present invention is not limited to use with any particular size of pipe. The term plastic is used broadly throughout this application to embrace all of the many nonmetallic compounds synthetically produced which are suitable for use in the manufacture of pipe. Although the pipe P shown is circular in section, the invention is applicable to pipes of other shapes, such as oval or polygonal or even irregular shapes.

Above the pipe P in FIG. 1, there is shown a pipe fitting generally designated 10, having the form of a "T" with a vertically disposed tubular member 11 and a tubular stem 12 extending perpendicularly from the mid portion of the cross member 11. A cap 13 closes the outer end of the stem 12. In accordance with the method of the invention the fitting 10 is joined to the pipe P before making an opening in the pipe P to introduce a stopper into the pipe P to cut off flow of gas there-through.

FIG. 2 shows the fitting 10 secured to the wall 14 of the pipe P with the axes of the pipe P, cross member 11 and stem 12 all mutually perpendicular. Preferably the fitting 10 is of the same plastic material as the pipe P, such as relatively rigid polyethylene, in which case the parts may be joined by fusion. Such fusion joining can be accomplished by heating the wall 14 of the pipe P and the end of the cross member 11 to be attached thereto with a hot iron shaped to the desired contour for even heating of the plastic surfaces. When the surfaces have melted, the iron is removed from between them and the fitting 10 is pushed firmly against the pipe wall 14 to form a joint which is gas tight after cooling and solidifying. No gas comes into contact with the hot parts since the wall 14 is not breached. Members of other plastic materials, whether of like or disparate material, might be more effectively joined with cement.

It will be noted that the tubular member 11 has internal threads throughout and has external threads at a cap-receiving area 15 near its outer end. Closer to the outer end of the member 11 than the threaded area 15, there is an annular groove and an O-ring seal member 16 seated in the groove. The internal threads of the tubular member 11 cooperate with external threads of a cutter 17 as shown in FIG. 3 for cutting a round hole at 18 through the pipe wall 14 coaxial with the tubular member 11, but smaller than the internal diameter of the tubular member 11. The rim 19 of the hole 18 within the tubular member 11 forms a shoulder.

The cutter 17, shown in FIGS. 3, 5 and 6, has a sharp cutting blade 20 projecting from a generally cylindrical body 21 which is externally threaded, and there is a hexagonal socket 22 across the rear of the cutter body 21 for acceptance of a tool 23 such as a wrench for driving the cutter 17. FIG. 3 shows the tool 23 rotating the cutter 17 to cut the hole 18 in the pipe wall 14. It will be appreciated that the interfit of threads on the cutter 17 and in the tubular member 11 minimizes gas leakage from the pipe P after the pipe wall 14 has been cut through. The cutter 17 can, if desired, be of the type which retains the coupon cut out from the pipe wall 14 so that the cut out piece does not fall into the pipe P. The form of cutter 17 shown is only for purposes of illustration since various types of cutting tools will suggest themselves as suitable to those acquainted with pipe fitting, but the use of interfitting threads to minimize gas leakage is believed particularly advantageous.

The perspective view of FIG. 4 shows a compression cap 24 ready for threaded attachment to the threaded end portion 15 of the tubular member 11. The cap 24 has a hex headed outer end at 25, and is shown in FIG. 4 fitted with a flat plug 26. Preferably the cap 24 is of the same plastic material as the fitting 10. It will be seen that after removal of the wrench 23 the cap 24 with its plug 26 can be screwed in place on the threaded portion 15 of the upstanding tubular member 11, with gasket 16 providing a gas tight seal.

FIG. 5 shows the cap 24 fitted loosely in place, that is, not fully screwed down, on the tubular member 11. The cutter 17 is still in place in FIG. 5, and FIG. 6 shows that the hole 27 of the cap 24, normally closed by the plug 26, is large enough to permit withdrawal of the cutter 17 therethrough. As shown in FIGS. 5 and 6, as well as other drawing figures, the compression cap 24 is generally cylindrical, with a partial wall 28 extending inward at one end to define the threaded hole 27 for closure by means of the plug 26. Not until the cutter 17 has been removed as in FIG. 6, can any gas from the pipe P escape to the atmosphere, and since the passage formed by the tubular element 11 is quickly closed again, the relatively low pressure gas does not escape in any significant quantity. Before going on to the next stage of the procedure of the invention, it should be noted that an internal ringlike seal generally designated 30 extends around the interior of the cap 24, and that in the loose condition shown in FIGS. 5-7, the seal 30 is not under compression, but just resting against a shoulder 31 provided by an area of reduced diameter near the upper end of the cap 24.

Attention is now directed to FIGS. 7 and 8 of the drawings showing the insertion of a balloon-type stopper, here exemplified by a commercially available Gardner-Goodman Stopper generally designated by the reference character G. The stopper G will not be described in detail, since the particular constuction of the stopper forms no part of this invention, but for the sake of completeness, a brief description of the stopper G follows:

The balloon-type stopper G has an elongated cylindrical body 32 sized to fit slidably within the cap 24 and within the tubular member 11. Stoppers like the stopper G come in a variety of standard sizes, so for example, if the tubular member 11 has an inside diameter of about 2 inches, there is a stopper G having a cylinder 32 with a diameter slightly less than 2 inches for sliding fit therein, and such a stopper will serve to close a pipe main P having an internal diameter of about 6 inches. The stopper G has an inflatable balloon 33 of sturdy material such as rubber-lined cloth, which balloon is arranged to be extended from position within the cylinder 32 (as shown in FIGS. 7, 9, 11 and 16) to an extended position outside the cylinder 32 (as shown in FIG. 13) by means of a sliding shaft 34. The shaft 34 is tubular for the introduction of air therethrough to inflate the balloon 33, and has a handle 35, a nipple 36 for connection to a pump or the like (not shown in the drawing) and a pressure gauge 37 to show that the balloon 33 has been inflated to a sufficient degree of pressure to seal off the flow of gas through a pipe. To use the stopper G, the operator normally would ordinarily screw threads at the end of the cylinder 32 into a threaded hole in a metal pipe wall, push down on the handle 35 to extend the balloon 33 into the pipe, and then inflate the balloon 33 with a hand pump such as a "bicycle pump". The stopper G is not screwed in place in any threaded hole, but is slidably inserted through the compression cap 24 and the tubular member 11 as shown in FIG. 7.

The stopper cylinder 32, the hole 27 in the compression cap 24, and the ringlike seal 30 are all of such size that the cylinder 32 is initially slidable through, but is closely surrounded by the hole 27 and seal 30 before the cap is tightened on to the member 11. After insertion of the cylinder 32 as shown in FIGS. 9, 11, 13 and 14, the rim 19 around the hole 18 in the pipe P, which has a smaller diameter than the stopper cylinder 32, acts as a stop, preventing further inward motion of the cylinder 32 past the position at which the balloon 33 will be centered within the pipe P.

FIG. 9 shows the cylinder 32 of the stopper G in position, resting against the shoulder formed by the rim 19. The next step of the operation is the screwing down of the compression cap 24 on the threads of the tubular member 11 at 15 to exert compressive force on the ringlike seal 30. The screwed-down position of the cap 24 is shown in FIGS. 11 and 12, which can be compared with FIGS. 9 and 10 to show the action of the seal 30. As seen in FIG. 10, the seal 30 comprises a flat gasket ring 40 of elastomeric material sandwiched between a pair of flat washers 41 and 42. The washer 41 rests between the shoulder 31 of the cap 24 and the gasket ring 40, and when the cap 24 is screwed down as shown in FIGS. 11 and 12 the washer 42 is pressed by the end of the tubular sleeve 11. Compression of the gasket 40 between the washers 41 and 42 causes deformation of the gasket 40 so that the gasket 40 is extruded radially inward to a smaller diameter of ring opening, and thus into tight sealing engagement with the cylinder 32 around its entire circumference. Gas cannot lead past the location of the gasket 40. After the cap 24 has been screwed down, the operator extends the balloon 33 into the pipe P as shown in FIG. 13 by pushing on the handle 35 of the stopper G. Then the balloon 33 is inflated to the condition shown in FIG. 14 by pumping air into the stopper G through the nipple 36. When the balloon 33 has been inflated gas flow in the pipe P is shut off.

If desired, a branch pipe line shown at 43 in FIGS. 14 and 15 can be attached to the stem 12 of the fitting 10, either by means of a coupling member shown generally at 44 or by other suitable means while the gas flow is shut off by the balloon 33. After deflation and retraction of the balloon 33 and withdrawal of the cylinder 32, the cutter 17 is preferably fitted again within the cross member 11 of the fitting 10 and the cap 24 can be closed by means of a plug 26, which can be of the same plastic material as the fitting 10 or of metal such as brass. The replaced cutter 17 is so positioned that it will not interfere with gas flow to the branch line 43, but when it is desired to cut off flow to the branch line 43 at some later time, it is a simple matter to open the cap 24 and screw down the cutter 17 to a position close to the pipe P and thereby cut off flow of gas to the branch line 43. The plugged cap 24 as shown in FIG. 15 effects a tight seal. Alternatively, the cap 24 could be removed and replaced with a permanently closed completion cap formed as a unitary member like the smaller cap 13 shown on the fitting stem 12 in FIG. 1, in which case the O-ring 16 will prevent gas leakage.

The modified fitting 50 shown in FIG. 16 is similar in structure and use to the fitting 10 except that there is no branch 12, that is, the fitting 50 is a simple straight internally threaded tube, which can be used when no branch connection is desired. Whether the nipple fitting 50 of FIG. 16 or the "T" fitting 10 of the other drawing figures is employed, it is presently contemplated that the stopper-receiving tubular part of the fitting will have an internal diameter of about 2 inches and an axial length of from about 4 to about 6 inches, but fittings of other dimensions may be used depending upon the application.

The presently preferred material for the fittings 10 and 50 is polyethylene such as that used in pipe and fittings distributed under the mark or name "DRISCO" by Phillips Petroleum Company, but the fittings can be of any plastic material compatible with the material of the plastic pipe main and approved for natural gas service. The presently preferred material for the gasket 40 is butyl rubber, but the gasket 40 could be of some other elastomeric material that is resistant to natural gas. The washers 41 and 42 that retain the gasket can be steel.

Various other materials, changes in the dimensions of parts and other modifications and applications will suggest themselves to those acquainted with the art, and are considered to be within the spirit and scope of the invention.

What is claimed is:

1. A method of temporarily stopping the flow of gas in a pipe main of plastic material and then restoring gas flow with minimal leakage to the atmosphere comprising joining a plastic pipe fitting at essentially a right angle to the main pipe by fusing the pipe fitting to the pipe main, cutting through the pipe main at the area of the pipe main defined within the fitting by using a tool inserted through the fitting sized to maintain a seal in the fitting for preventing escape of gas while cutting and to cut a hole smaller than the internal cross sectional area of said pipe fitting to provide an internal ledge within said fitting for accurate positioning of a stopper, applying a compression type cap having gas seal means to said fitting and then withdrawing the tool through a hole in said cap and inserting a balloon-type stopper through said hole in the cap and inflating the balloon of said stopper in the pipe main and maintaining a seal in the fitting between said cap gas seal means and said stopper while inflating said balloon of said stopper, then restoring gas flow by deflating said balloon and withdrawing said stopper, and placing a closure in the hole of said cap.

2. The method of claim 1 wherein the pipe fitting has a branch connection and including opening said branch connection after stopping said gas flow so that upon restoring gas flow the branch connection serves as a gas outlet branch.

3. The method of claim 2 and including leaving a cutter of said tool in said fitting after withdrawing said stopper, whereby said cutter can be used to cut off flow of gas to said branch connection when desired.

4. A method of temporarily stopping the flow of gas in a pipe main of plastic material and then restoring gas flow with minimal leakage to the atmosphere comprising joining a plastic pipe fitting at essentially a right angle to the main pipe by fusing the pipe fitting to the pipe main, cutting through the pipe main at the area of the pipe main defined within the fitting by using a tool inserted through the fitting sized to maintain a seal in the fitting for preventing escape of gas while cutting and applying a compression type cap having gas seal means to said fitting and then withdrawing the tool through a hole in said cap and inserting a balloon-type stopper through said hole in the cap and inflating the balloon of said stopper in the pipe main and maintaining a seal in the fitting between said cap gas seal means and said stopper while inflating said balloon of said stopper, then restoring gas flow by deflating said balloon and withdrawing said stopper, and placing a closure in the hole of said cap.

* * * * *